United States Patent
Lin et al.

(10) Patent No.: US 9,240,210 B2
(45) Date of Patent: Jan. 19, 2016

(54) PHYSICAL SUBSECTOR ERROR MARKING

(71) Applicant: Seagate Technology LLC, Cupertino, CA (US)

(72) Inventors: Weihua Lin, Plymouth, MN (US); Brian Thomas Edgar, Minneapolis, MN (US); Gerald Allen Houlder, Shakopee, MN (US); Yong Yang, Edina, MN (US); Shuangyi Tang, Eden Prairie, MN (US); Vidya Krishnamurthy, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 75 days.

(21) Appl. No.: 14/090,984

(22) Filed: Nov. 26, 2013

(65) Prior Publication Data

US 2015/0149869 A1    May 28, 2015

(51) Int. Cl.
*H03M 13/29* (2006.01)
*G11B 20/18* (2006.01)

(52) U.S. Cl.
CPC .................................. *G11B 20/1889* (2013.01)

(58) Field of Classification Search
CPC .................................................. G06F 11/1008
USPC .................... 714/770, 758, 763, 6.1
See application file for complete search history.

(56) References Cited

U.S. PATENT DOCUMENTS

| | | | |
|---|---|---|---|
| 4,972,316 A | | 11/1990 | Dixon |
| 6,128,698 A | * | 10/2000 | Georgis ........................ 711/111 |
| 6,321,358 B1 | * | 11/2001 | Anderson ...................... 714/763 |
| 6,539,496 B1 | | 3/2003 | Peters et al. |
| 2006/0248433 A1 | * | 11/2006 | Larsen et al. ................. 714/758 |
| 2009/0055682 A1 | * | 2/2009 | Gibson et al. ..................... 714/6 |
| 2011/0019526 A1 | * | 1/2011 | Naohara .................... 369/275.3 |
| 2011/0302446 A1 | * | 12/2011 | Becker-Szendy et al. ..... 714/6.1 |

FOREIGN PATENT DOCUMENTS

| | | |
|---|---|---|
| EP | 0163881 A1 | 12/1985 |
| WO | 85/01380 | 3/1985 |
| WO | 96/13914 A2 | 5/1996 |
| WO | 2007/142848 A2 | 12/2007 |

\* cited by examiner

*Primary Examiner* — Fritz Alphonse
(74) *Attorney, Agent, or Firm* — HolzerIPLaw, PC

(57) ABSTRACT

Physical subsector error marking allows for selectively marking subsectors of a physical sector of a storage medium as unreadable. The error marking may include a bad sector mask to indicate that the subsector is unreadable combined with an error signature to confirm that the bad sector mask was set intentionally. The remaining readable subsectors of the physical sector may be returned to the host.

19 Claims, 4 Drawing Sheets

PHYSICAL SUBSECTOR ERROR MARKING

BACKGROUND

Storage media (e.g., a hard magnetic disc) may be divided into a number of physical sectors for storing data (e.g., 512 byte sectors). One or more of the physical sectors may be rendered unreadable either due to physical defects on a storage medium or a desire to avoid reading and/or writing data from that physical sector on the storage medium.

Advanced format storage media may utilize larger physical sectors for storing data (e.g., 4096-byte, or 4K-byte sectors). As a result, a corresponding storage drive may map multiple host blocks to a single physical sector on the storage medium within the drive (e.g., eight 512-byte host blocks are mapped to a 4K-byte sector). One or more sub-sectors associated with the host blocks mapped to the single physical sector may be rendered unreadable. However, conventionally marking the entire physical sector of the storage medium may waste valuable storage space within the physical sector that is otherwise readable.

SUMMARY

Implementations described and claimed herein address the foregoing problems by providing a method comprising marking a subsector of a physical sector on a storage medium with a code that indicates that user data stored in the subsector is unreadable.

Other implementations are also described and recited herein.

BRIEF DESCRIPTIONS OF THE DRAWINGS

DETAILED DESCRIPTIONS

Figure 1:
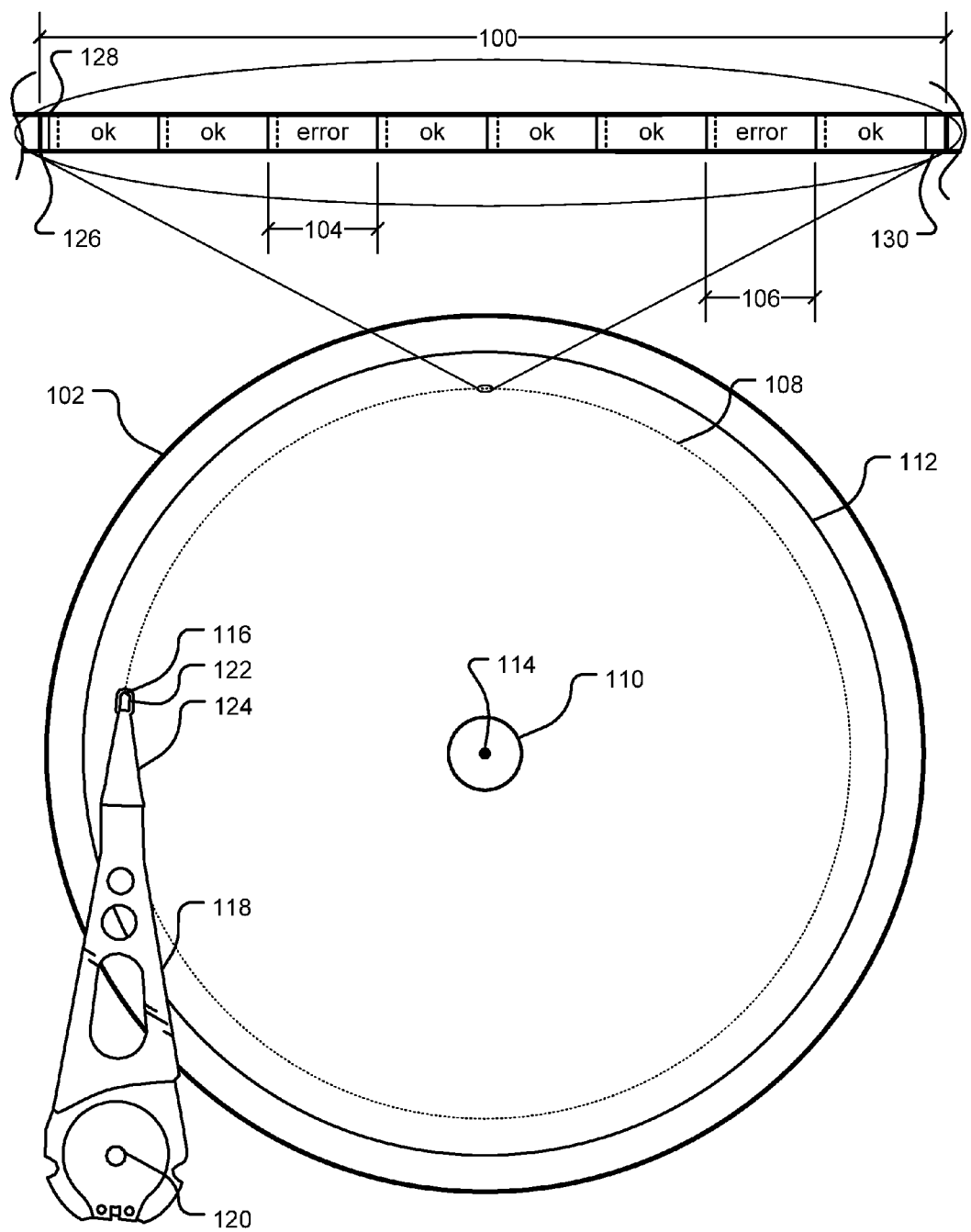
FIG. 1 illustrates a single physical sector of an example storage disc with two sub-sectors marked as unreadable.

FIG. 1 illustrates a single physical sector 100 of an example storage disc 102 with two sub-sectors 104, 106 marked as unrecoverable. The storage disc 102 (or platter) may be one of multiple discs in a storage drive (not shown). The storage disc 102 stores data on one or both of its planar surfaces (only one planar surface of storage disc 102 is shown). Further, each planar surface capable of storing data includes a series of thin concentric circular strips known as tracks (e.g., track 108) located between an inner writable diameter 110 and an outer writable diameter 112 of the storage disc 102. The disc 102 rotates about a spindle 114 as data is read and/or written to the tracks via a read/write head 116.

The head 116 is attached to a distal end of an actuator arm 118, which precisely rotates about a spindle 114 to orient the head 116 over a desired track on the disc 102 for read/write operations. The head 116 is attached to an air-bearing slider 122, which in turn is attached to a flexure 124 at the distal end of the actuator arm 118. The slider 122 faces the storage disc 102 with the head 116 attached to a trailing edge of the slider 122. Due to aerodynamic forces created by the rotation of the disc 102 with respect to the head 116 and flexible properties of the flexure 124, the slider 122 flies in close proximity above the disc 102 surface. Electrical wires (not shown) extend along the actuator arm and attach to contact pads (not shown) on the slider that ultimately connect to the head 116. Read/write and other electrical signals pass to and from processing electronics (not shown) to the head 116 via the electrical wires and contact pads.

Each track on the storage disc 102 is made up of a predefined number of physical sectors (e.g., physical sector 100). A physical sector is the smallest storage unit that is addressable by the storage drive. Traditionally, physical sectors are 512 bytes. In advanced format storage media, physical sector size is significantly increased (e.g., an increase from 512 bytes to 4090 bytes) As a result, multiple host blocks of data may be assigned to a single physical sector. For example, to maintain backward compatibility with a 512-bye sector layout, a 4090-byte physical sector may be divided into eight distinct 512-byte subsectors. In other implementations, the physical sector size, sub-sector size, and/or sub-sector number per physical sector may vary.

The example physical sector 100 is one of many physical sectors arranged end-to-end around track 108. Physical sector 100 sequentially includes a sync mark 126, an address mark 128, eight subsectors (e.g., subsectors 104, 106), and an error correction coding (ECC) section 130. During a read operation, the sync mark 126 identifies the beginning of the sector 100 and provides timing alignment to the read operation. The address mark 128 identifies the physical sector 100 by number and location. The eight subsectors contain user data and metadata regarding the user data. The ECC section 130 contains error correction codes that are used to repair and recover data that might be damaged during reading and/or writing operations. In various implementations of the presently disclosed technology, none of the sync mark 126, the address mark 128, and the ECC section 130 are affected by the error marking disclosed in detail below.

Two of the eight subsectors (i.e., subsectors 104, 106) are marked with a code that indicates that the subsectors are unreadable (i.e., a read attempt on subsectors 104, 106 returns an "error"). The error code on subsectors 104, 106 may be set due to physical defects on the disc 102 or a desire to avoid reading and/or writing data from those subsectors. However, the remaining six subsectors of the physical sector 100 are readable (i.e., they are "ok") and may be read during the read operation on physical sector 100 and returned to a host.

The storage disc 102 may be a magnetic or optical storage disc, for example. Storage drives without one or more storage discs functioning as storage media (i.e., non-disc storage drives, such as solid-state drives) may also incorporate the presently disclosed technology when individual physical sectors of the non-disc storage media are divided into subsectors. Some of the subsectors may be marked with the "error" code discussed herein to render those subsectors unreadable.

Figure 2:
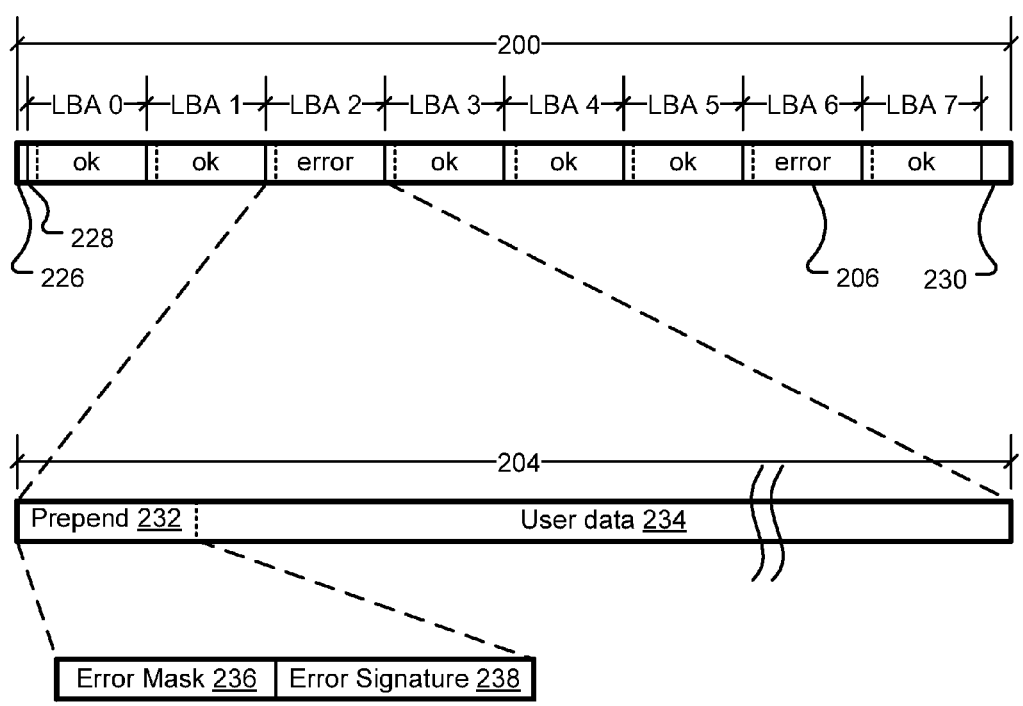
FIG. 2 illustrates prepend metadata of a subsector of a physical sector of a storage medium containing an error code.

FIG. 2 illustrates prepend metadata 232 of a subsector 204 of a physical sector 200 of a storage medium (not shown) containing an error code. The physical sector 200 sequentially includes a sync mark 226, an address mark 228, eight subsectors (e.g., subsector 204), and an error correction coding (ECC) section 230. During a read operation, the sync mark 226 identifies the beginning of the sector 200 and provides timing alignment to the read operation. The address mark 228 identifies the physical sector 200 by number and location. The eight subsectors contain user data and metadata regarding the user data. The ECC section 230 contains error correction codes that are used to repair and recover data that might be damaged during reading and/or writing operations. In various implementations of the presently disclosed technology, none of the sync mark 226, the address mark 228, and the ECC section 230 are affected by the error marking disclosed in detail below.

Logical block addressing (LBA) is a mapping scheme for specifying the location of specific blocks of data stored within a storage drive (e.g., a hard disc drive, a solid state drive, etc.). LBA is a linear addressing scheme where the blocks of data are located by an integer index, with the first block assigned to LBA 0, the second block assigned to LBA 1, and so on. Here, each of the eight subsectors corresponds to a LBA number. For example, the first subsector corresponds to LBA 0, the second subsector corresponds to LBA 1, and so on until all subsectors of all physical sectors within a storage drive are assigned a unique LBA.

Further, each of the eight subsectors includes a prepend portion and a user data portion (e.g., prepend 232 and user data 234 of subsector 204). The prepend portion includes metadata about the user data within the subsector. For readable subsectors (i.e., subsectors marked "ok"), the prepend metadata includes information for user data identification, error recovery, etc. For unreadable subsectors (i.e., subsectors marked "error"), the metadata is changed in a manner that indicates the error while losing as little as possible of the previous functionality of the metadata. The majority of the previous functionality of the metadata is retained in case the subsector is incorrectly marked as unreadable and needs to be restored as a readable subsector.

In one implementation, the prepend 232 includes a bad sector mask 236 and an error signature 238. The bad sector mask 236 indicates that the subsector 204 is marked unreadable. The bad sector mask 236 may be any variation from an expected value of the prepend 232. The error signature 238 confirms that the subsector 204 is unreadable. This redundancy ensures that the subsector 204 is not inadvertently marked unreadable. In further implementations, the user data 234 of the subsector 204 is also edited in a manner that indicates that the subsector 204 is unreadable.

In an example implementation, the bad sector mask 236 is a specific code that identifies the subsector 204 as unreadable and the error signature 238 inverts the remaining information in the prepend 232 (e.g., the subsector LBA). As a result, a majority of the information in the prepend 232 is maintained and may be restored (e.g., by reversing the inversion of the information in the prepend 232) if the subsector is to be restored to a readable condition. Similarly, the user data 234 of the subsector 204 may also be inverted to confirm that the subsector 204 is unreadable and may be restored by reversing the inversion of the user data 234.

Subsector 206 includes a similar error mask and error signature in the prepend associated with subsector 206. As a result, subsector 206 is also unreadable (i.e., an attempted read operation returns an "error"). The remaining subsectors in sector 200 are readable (i.e., an attempted read operation is successful or "ok") and may be returned to a host during the read operation.

Figure 3:
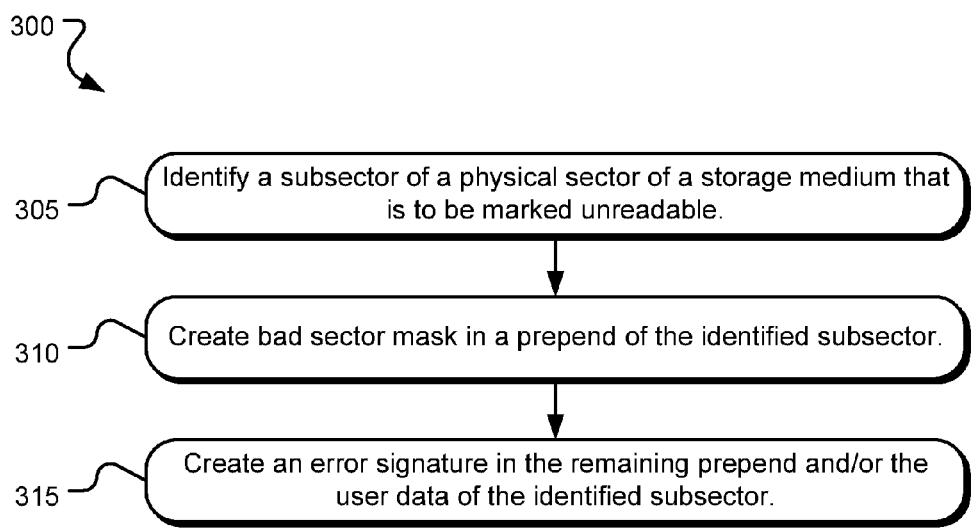
FIG. 3 illustrates example operations for marking a sub-sector of a physical sector of a storage medium as unreadable.

FIG. 3 illustrates example operations 300 for marking a subsector of a physical sector of a storage medium as unreadable. The physical sector of the storage medium is divided into a number of subsectors, each with a unique LBA. An identification operation 305 identifies a subsector of the physical sector of the storage medium that is to be marked unreadable. The subsector may be so identified either due to physical defects on the storage medium or a desire to avoid reading and/or writing data from that subsector on the storage medium.

A first creation operation 310 creates a bad sector mask in a prepend of the identified subsector. The subsector includes prepend metadata followed by user data. The prepend metadata is intentionally corrupted via the first creation operation 310 by either including a code that indicates that the subsector is unreadable or simply changing the prepend data such that it does not match an expected value of the prepend data.

A second creation operation 315 creates an error signature in the remaining prepend and/or the user data of the identified subsector. Since the prepend data may become unintentionally corrupted in subsectors that are not marked as unreadable, the error signature is used to confirm that the subsector is indeed intentionally marked as unreadable. In various implementations, the second creation operation 315 changes as little as possible of the remaining prepend and/or user data such that the prepend and/or user data may be later recovered if the subsector is restored to a readable condition. For example, the second creation operation 315 may merely invert values of the remaining prepend and/or user data. The inversion may then be reversed if the subsector is to be restored to a readable condition.

In various implementations, operations 300 may be performed once during commissioning of the storage medium or multiple times throughout the life of the storage medium as subsectors that are to be marked unreadable change.

Figure 4:
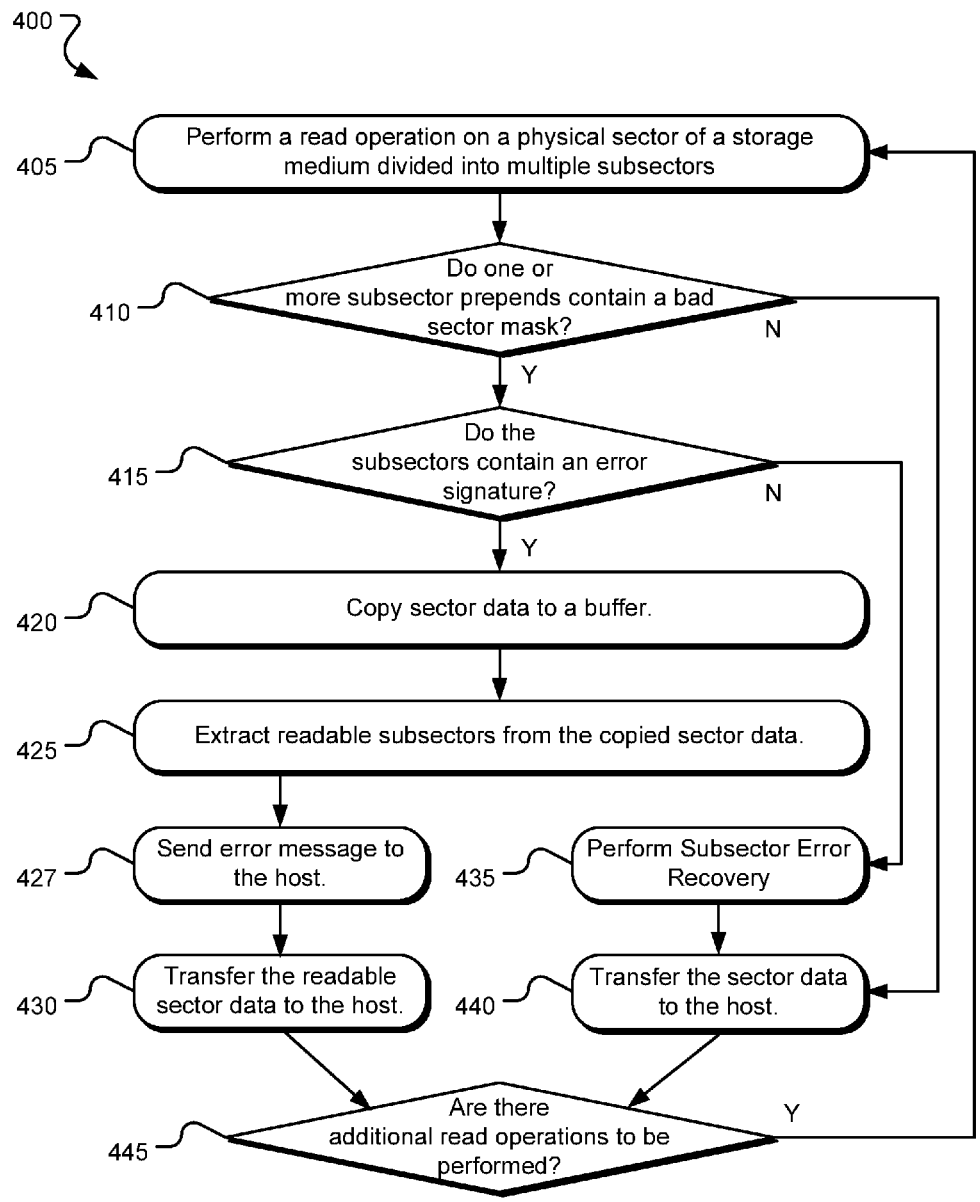
FIG. 4 illustrates example operations for accessing an unreadable subsector of a physical sector of a storage medium.

FIG. 4 illustrates example operations 400 for accessing an unreadable subsector of a physical sector of a storage medium. A performing operation 405 performs a read operation on the physical sector of the storage medium, which is divided into multiple subsectors. Decision operation 410 decides if one or more subsector prepends contains a bad sector mask. More specifically, the decision operation 410 compares each subsector prepend to an expected subsector prepend value. If all of the subsector prepends match the expected values, the decision operation 410 determines that the subsector prepends are good and all subsectors contain readable data. Transferring operation 440 transfers the sector data to the host. Decision operation 445 determines if there are any additional read operations to be performed on the storage medium. If so, performing operation 405 is repeated and operations 400 continue. If not, operations 400 end.

If one or more of the subsector prepends do not match the expected prepend values, the decision operation 410 determines that the corresponding subsectors contain an error, which is either an unintentional error or the subsector is intentionally marked as containing unreadable data. Decision operation 415 determines if the corresponding subsector also contain an error signature. The error signature may be within the erroneous subsector prepend or within the corresponding subsector user data. The error signature verifies that the subsector prepend error was intentional and that the subsector was intentionally marked unreadable. In one implementation, the error signature inverts values of the prepend and/or user data in the corresponding subsector. By merely inverting the data, if the error signature is erroneously applied to the subsector, the prepend and/or user data may be restored by reversing the inversion.

If the subsector does not contain the error signature, performing operation 435 performs error recovery operations to restore the prepend data to the expected prepend value. Transferring operation 440 transfers the sector data, including the restored subsector data, to the host. Decision operation 445 determines if there are any additional read operations to be performed on the storage medium. If so, performing operation 405 is repeated and operations 400 continue. If not, operations 400 end.

If one or more subsectors contain both the bad sector mask and the error signature, the subsector prepend error(s) were intentional and the subsector(s) were intentionally marked unreadable. Copying operation 420 copies the sector data to a buffer. Extracting operation 425 extracts the readable subsectors from the copied sector data. Sending operation 427 sends an error message to the host regarding the unreadable subsector data. Transferring operation 430 transfers the readable subsector data to the host. Decision operation 445 determines if there are any additional read operations to be performed on the storage medium. If so, performing operation 405 is repeated and operations 400 continue. If not, operations 400 end.

The embodiments of the invention described herein are implemented as logical steps in one or more computer systems including hardware and/or in software (including firmware, resident software, micro-code, etc.) components. For example, the logical operations described herein are implemented (1) as a sequence of processor-implemented steps executing in one or more computer systems; and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

Various implementations may take the form of a computer program product on a non-transitory or non-signal based computer-usable or computer-readable storage medium having computer-usable or computer-readable program code embodied in the medium for use by or in connection with an instruction execution system. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
    providing a storage medium having a physical sector divided into subsectors, each subsector comprising a prepend and user data;
    marking the prepend of a subsector with a specific code that indicates that user data stored in the subsector is unreadable.

2. The method of claim 1, wherein the subsector stores a single host block of data.

3. The method of claim 1, wherein the code includes one or more of a bad sector mask and an error signature.

4. The method of claim 3, wherein the error signature is contained within one or both of the subsector prepend and user data stored within the subsector.

5. The method of claim 3, wherein the error signature inverts one or more of the subsector prepend and user data stored within the subsector.

6. The method of claim 1, wherein the physical sector includes eight subsectors.

7. The method of claim 1, wherein the storage medium is a magnetic disc.

8. A storage medium comprising:
    a physical sector divided into subsectors, wherein a subsector contains a code stored in a prepend of the subsector that indicates user data stored in the subsector is unrecoverable, where the code includes one or more of a bad sector mask and an error signature.

9. The storage medium of claim 8, wherein the subsectors each store a single host block of data.

10. The storage medium of claim 8, wherein the error signature is contained within one or both of the subsector prepend and user data stored within the subsector.

11. The storage medium of claim 8, wherein the error signature inverts one or more of the subsector prepend and user data stored within the subsector.

12. The storage medium of claim 8, wherein the physical sector includes eight subsectors.

13. The storage medium of claim 8, wherein the storage medium is a magnetic disc.

14. One or more non-transitory, computer-readable storage media encoding computer-executable instructions for executing on a computer system a computer process comprising:
    reading a subsector prepend of a physical subsector of a physical sector of a storage medium;
    determining if the prepend contains a bad sector mask; and
    returning an error that the subsector is unreadable to the host.

15. The computer-readable storage media of claim 14, wherein the subsector stores a single host block of data.

16. The computer-readable storage media of claim 14, wherein the computer process further comprises:
    determining if the subsector contains an error signature, wherein the returning operation is performed in response to determining that the subsector contains the error signature.

17. The computer-readable storage media of claim 16, wherein the error signature is contained within one or both of the subsector prepend and user data stored within the subsector.

18. The computer-readable media of claim 16, wherein the error signature inverts one or more of the subsector prepend and user data stored within the subsector.

19. The computer-readable storage media of claim 14, wherein the storage medium is a magnetic disc.

* * * * *